United States Patent [19]

Young

[11] Patent Number: 4,795,570

[45] Date of Patent: Jan. 3, 1989

[54] TWO-STAGE BATCH FILTER APPARATUS AND FILTRATION PROCESS

[75] Inventor: Edward G. Young, Lisbon, Me.

[73] Assignee: Andy River Inc., Lisbon, Me.

[21] Appl. No.: 70,548

[22] Filed: Jul. 7, 1987

[51] Int. Cl.⁴ .............................................. B01D 37/00
[52] U.S. Cl. .................................... 210/770; 210/780;
210/350; 210/355; 210/407; 55/493
[58] Field of Search ............... 210/770, 780, 350, 354,
210/407, 497.01, 355; 55/500, 293, 493

[56] References Cited

U.S. PATENT DOCUMENTS

| | | | |
|---|---|---|---|
| 2,312,999 | 3/1943 | De Langen | 210/407 |
| 3,276,594 | 10/1966 | Gwilliam | 210/350 |
| 3,428,181 | 2/1969 | Levis | 210/333 |
| 3,687,287 | 8/1972 | Gwilliam | 210/350 |
| 3,753,499 | 8/1973 | Gwilliam | 210/79 |
| 3,900,403 | 8/1975 | Randle et al. | 210/350 |
| 4,014,796 | 3/1977 | Sugiyama et al. | 55/500 |
| 4,246,122 | 1/1981 | Keat | 210/350 |
| 4,533,472 | 8/1985 | Verri et al. | 210/350 |

*Primary Examiner*—Bernard Nozick
*Attorney, Agent, or Firm*—Finnegan, Henderson, Farabow et al.

[57] ABSTRACT

An apparatus and process for removing liquid from a liquid-solid mixture by forcing the liquid-solid mixture under low pressure through a filter means attached to filter support doors to form a filter cake, supplying compressed air into an expandable space to deform an elastomeric bladder which squeezes additional liquid out of the cake, and opening the filter support doors to cause discharge of the filter cake from the filter means.

20 Claims, 3 Drawing Sheets

TWO-STAGE BATCH FILTER APPARATUS AND FILTRATION PROCESS

BACKGROUND OF THE INVENTION

The present invention relates to a filter device and filtration process and more particularly to a two-stage batch filter apparatus and process for removing liquid from liquid-solid mixtures.

Both municipal and industrial waste water treatment systems are faced with ever-increasing demands for improved quality of the effluent they generate. Recent clean water legislation mandates that all municipal and industrial waste water treatment systems must meet far more demanding standards in terms of suspended and dissolved solids, heavy metal content and the like, than has heretofore been the case. The waste water engineering industry is now searching to find practical systems which efficiently treat widely varied input loads and which can be operated simply at a reasonable cost. It is also a great advantage to any such waste water treatment system if the "solid" waste product which is produced has some further utility, and if the filtrate is clear not only of suspended but of dissolved solids.

The most significant problem in extracting suspended solids in a waste water treatment system is extracting the highest percentage of solids from the composition being fed into the system. The percentage of solids which can be extracted will vary, given the percentage of solids in the input load, the composition of the input fed into the system, the percentage of organic versus inorganic matter, the weight of the suspended matter, and various other factors. In general, most waste water dewatering systems obtain a solids level of between 15% and 30%, with the latter being achieved only in long throughput processes at considerable cost. The various dewatering systems in use (screws, honeycomb rolls, drum presses, etc.) all have significant limitations.

U.S. Pat. No. 3,687,287 to Gwilliam (Gwilliam I) discloses a two-stage method of reducing the liquid content of a slurry which utilizes a pressure filter comprising a cylindrical filter element, inner and outer tubular bodies, and an impermeable elastic sleeve which divides the filter into two compartments, a filtration compartment and a pressure compartment. The slurry is forced through a filter element under low pressure to remove most of the liquid to form a filter cake, then the elastic sleeve is deformed under high pressure to squeeze additional liquid out of the cake. The disclosed process uses high pressure (500 psi) which can create safety problems and which is also expensive to generate. In addition, this process and apparatus uses blasts of compressed air to remove the filter cake from the filter element. This requires the additional process steps of lowering the entire inner tubular body, introducing compressed air blasts until the cake is discharged, and then raising the inner tubular body back into its original position.

U.S. Pat. No. 3,753,499 to Gwilliam (Gwilliam II) discloses a two-stage pressure filter for reducing the liquid content of a slurry, like Gwilliam I, that comprises a cylindrical filter element, inner and outer tubular bodies, and an impermeable elastic sleeve dividing the filter into two compartments. The elastic sleeve in Gwilliam II has at least one annular portion which is substantially thicker than the remainder thereof to yield a thinner filter cake at the position corresponding to the thicker elastic sleeve portion. The object is to produce a filter cake that is thinner at some portions in an attempt to facilitate discharge of the cake. However, as in Gwilliam I, it is still necessary to utilize the additional steps of lowering the entire inner tubular body, introducing the compressed air blasts until the cake is discharged, then raising the inner tubular body back into its original position.

U.S. Pat. No. 4,533,472 to Verri et al. discloses a two-stage pressure filter comprising a tubular filter fabric supported by a perforated basket and a tubular membrane which divides the filter into an annular filtration space and an annular pressure space. A first stage forces a liquid slurry through a filter fabric to form a filter cake and a second stage introduces air pressure to deform the membrane thus squeezing additional liquid from the filter layer. The filter cake is discharged by the operation of a hydraulic actuator and shaft which removes the basket and membrane arrangement from its original position. This turns the filter fabric inside-out to discharge the filter cake. Verri et al. thus also includes an additional mechanical step requiring the use of a hydraulic actuator and shaft.

U.S. Pat. No. 3,900,403 to Randle et al. discloses a cylindrical pressure filter similar to Gwilliam and Verri et al., except that the process consists of one stage only—a slurry is forced through a filter element by means of a pressurized impermeable sleeve to remove the liquid and form a "dry" filter cake. The filter cake is discharged either by injecting blasts of air and actuating a cylinder to slide down the filter cloth to force the cake off the cloth, or by vibrating the entire filter body by means of a torsional mode transducer. Either means of removing the filter cake represents additional mechanical steps with associated equipment.

All of these patents disclose batch filters which utilize an impermeable sleeve to squeeze a filter cake formed on a filter cloth. However, all require additional mechanical steps and equipment to achieve the removal of the filter cake. Therefore, there exists a need for a two-stage cylindrical pressure filter apparatus and process which can remove up to 50% of the liquid from a liquid/solid mixture, whereby the filter cake formed is removed simply, effectively, economically and safely without the requirement of costly, maintenance-intensive, mechanized steps.

It is an object of the present invention to provide a two-stage cylindrical pressure filter apparatus and process wherein in the first stage, a slrrry is forced through a filter means under low pressure to form a filter cake, and in the second stage, an elastomeric bladder is deformed under higher pressure into contact with the filter cake to squeeze additional liquid from the cake achieving removal of up to 50% of solids.

It is another object of the present invention to provide such a two-stage batch filter apparatus and process which achieves safe, economical, and effective discharge of the filter cake formed.

It is another object of the present invention to provide a two-stage batch filter apparatus and process which operates at lower pressures in the second stage than similar filters heretofore found in the art.

It is a further object of the present invention to provide a two-stage batch filter apparatus and process for removing liquid from a liquid/solid mixture whereby the solid matter remaining after filtration can be utilized as fuel to provide sufficient energy to operate the filter itself.

It is another object of the present invention to provide a filter apparatus and process whereby the filter cake formed on the filter member provides structural support for the perforated filter support doors.

Additional objects and advantages of the invention will be set forth in the description which follows, and in part will be obvious from the description, or may be learned by practice of the invention. The objects and advantages of the invention may be realized and obtained by means of the instrumentalitiss and combinations particularly pointed out in the appended claims.

SUMMARY OF THE INVENTION

To achieve the foregoing objects, and in accordance with the purposes of the invention as embodied and broadly described herein, a device for removing liquid from a liquid-solid mixture is provided. The device has a rigid gas impervious chamber located inside a perforated support frame to form a first annular space. An elastomeric bladder overlays the outer surface of the perforated support frame and is expandable to form a second, expandable annular space in flow communication with the first annular space. Perforated filter support doors are attached by hinges and in the closed position define a third annular space between the elastomeric bladder and th perforated filter support doors. Filter means are provided on the surface of the filter support doors. Means are also provided for introducing the liquid-solid mixture under pressure into the third annular space and for supplying compressed air to the expandable annular space.

The filter operates by introducing a liquid-solid mixture into the third annular space under low pressure, thus forcing the liquid portion of the mixture through the filter means and perforated filter support doors while retaining the solids portion of the mixture on the filter means, thereby forming a substantially solid filter cake. This stage is continued until the filter cake formed on the filtrr means obstructs the flow of the liquid-solid mixture. Gas pressure is then introduced into tee expandable annular space to deform the elastomeric bladder, thus forcing it into contact with the filter cake to squeeze additional liquid from the cake. When this second stage is complete, the hinged filter support doors are opened and the solid filter cake is discharged from the filter means.

It is preferable for the rigid gas impervious chamber, the perforated support frame, the elastomeric bladder, and the perforated filter support doors to have cylindrical configurations and to have one open end and one closed end. It is further preferable for the open ends of the chamber, the support frame, the bladder and the support doors to be closed by an upper plate cover adjacent the open ends. It is further preferable that the upper plate cover be attached to the chamber by means of a threaded member which can change the distance between the upper plate cover and the closed end of the chamber.

It is preferable for the third annular space to be divided into a plurality of sections to allow the formation of filter cake sections to facilitate cake removal. This may be accomplished by means of flexible dividers which extend across the third annular space. It is further preferred that there be two flexible dividers located adjacent the hinges to allow the formation of two filter cake halves and that the two flexible dividers be made of an elastomeric material, such as neoprene, each comprising two strips which are in contact with each other along the edge of the strips which contact the hinges with the opposite edges of the strips being separated by the elastomeric bladder.

It is further preferred that the edges of the strips separated by the elastomeric bladder be tapered. This allows the dividers to conform to the deformation of the elastomeric bladder created during the second filtration stage while still maintaining separation of the two filter cake halves.

BRIEF DESCRIPTION OF THE DRAWINGS

The accompanying drawings, which are incorporated in and constitute a part of the specification, illustrate a preferred embodiment of the invention and, together with the general description given above and the detailed description of the preferred embodiment given below, serve to explain the principles of the invention.

DESCRIPTION OF THE PREFERRED EMBODIMENT

Figure 1:
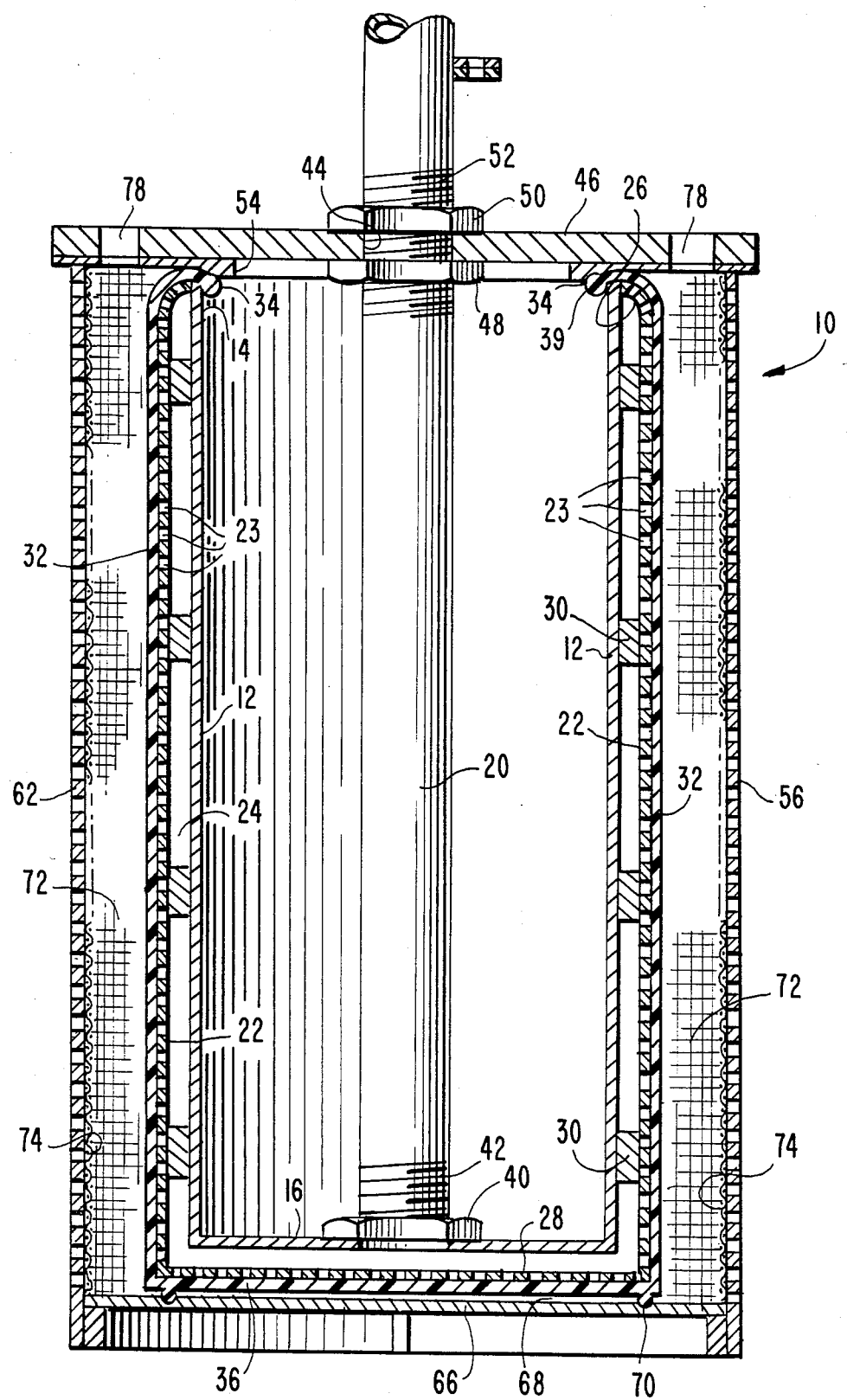
FIG. 1 is a cross-sectional side view of the filter in the closed position incorporating the teachings of the present invention.

The present invention will now be disclosed in terms of a preferred embodiment for removing a liquid from a liquid-solid mixture.

In accordance with the invention, there is provided a rigid gas impervious chamber. As here embodied and depicted in the Figures, the rigid gas impervious chamber comprises a cylindrical chamber 12 that is suspended within the device 10 in a manner that will be disclosed hereinafter. The cylindrical chamber can be made of any gas impervious material such as metal or polymer material capable of withstanding the pressures exerted on the cylindrical member during operation. In the embodiment disclosed, it is the function of the cylinrrical chamber to provide the interior surface of an expandable annular space. The chamber may also be ssed as a heat exchanger with a working fluid placed in contac with the walls of the chamber to either heat or cool the device.

As here embodied, the chamber has one open end 14 and a closed end 16. The closed end includes an opening 18 depicted in FIG. 2 providing flow communication through the closed end 16 of cylindrical chamber 12 to the interior of the conduit 20.

In accordance with the invention, there is provided a perforated support frame disposed adjacent and outside the gas impervious chamber so as to define a first annular space therebetween. As here embodied, there is a perforated closed-ended cylindrical support frame 22 surrounding the chamber 12 defining a first annular space 24 between the chamber 12 and the support frame 22. The support frame has an open end 26 and a closed end 28. The closed end 28 is adjacent the closed end 16 of the cylindrical chamber 12. As here embodied, the support frame 22 includes perforations 23 both on the cylindrical side wall and the closed end 28. As is most clearly depicted in FIG. 1, the cylindrical support frame is maintained at a distance from the chamber 12 by means of spacers 30 disposed both vertically and circumferentially between the chamber 12 and the support frame 22.

In accordance with the invention, there is provided a elastomeric bladder overlaying the outer surface of the perforated support frame, here embodied as the closed ended cylindrical elastomeric bladder 32. The bladder and the gas impervious chamber define an expandable annular space in flow communication through perforations in the perforated support frame with the first annular space. As here embodied, the bladder 32 has an open end 34 and a closed end 36. The bladder 32 is disposed to overlay the surface of the cylindrical support frame 22 having perforations 23 therein. Thus, when a working fluid such as compressed air is injected into the first annular space, that fluid passes through the perforations 23 and distends the elastomeric bladder 32 to form an expandable annular space between the outer surface of the cylindrical chamber 12 and the inner surface of the expandable bladder 32. As here embodied, the closed end 36 of the elastomeric bladder 32 includes a circumferential bead 38 disposed to retain the oeen end 34 of the bladder 32 in a sealed relationship with the cylindrical chamber 12. The sealed relationship is maintained in the embodiment depicted inasmuch as the conduit 20 is affixed to the cylindrical chabber 12 by means of a nut 40 disposed on external threads 42 of the conduit 20. The conduit 20 passes through an opening 44 in an upper plate 46. A pair of nuts, lower nut 50, and the upper nut 48, are disposed on upper external threads 52 on the conduit 20. By tightening the upper nut 50, thus shortening the distance between the upper nut and the closed end 16 of the cylindrical chamber 12, the open end 14 of the chamber 12 is drawn toward the upper plate 46 such that the open end 34 of the bladder 32 is captured between the open end 14 of the cylindrical chamber 12 and a sealing member 54 disposed on the lower surface of the upper plate 46. The circumferential bead 38 prevents the fluid pressure in the first annular space 24 from distending the bladder 32 and pulling the open end 34 out of its sealing relationship with the upper plate 46 or the sealing member 54 associated therewith. Thus, the conduit 20 provides a threaded member disposed to change the distance between the upper plate 46 and the closed end 16 of the cylindrical chamber 12. The conduit 20 also provides flow communication between a gas pressure supply means (not shown) and the first annular space 24.

In accordance with the invention, there are perforated filter support doors hingedly affixed to the device. The filter support doors are capable of rotating on hinges to open and closed positions whrein the filter support doors in the closed position define one wall of a third annular space surrounding the elastomeric bladder and the filter support member. As here embodied and most clearly depicted in FIG. 3, there are provided four hinged doors 56, 58, 60 and 62 that are depicted in the open position in FIG. 3 and the closed position in FIGS. 1 and 2. The doors hinge on hinge bolts 64 that pass through the upper plate 46 and are affixed to a lower plate 66 opposite the upper plate with the lower plate 66 and the closed end 36 of the bladder 32 defining a space 68 therebetween. As here embodied, the device includes a seal, shown here as the O-ring seal 70, at the outer circumferential portion of the bladder just beneath the outer circumferential edge of the cylindrical support frame. The lower plate includes grooves disposed to locate the O-ring 70 in a specific circumferential location. It is the function of the O-ring to prevent the liquid-solid mixture introduced to the outer surface of the bladder 32 from entering the space 68 between the lower plate 66 and the bladder 32.

Figure 2:
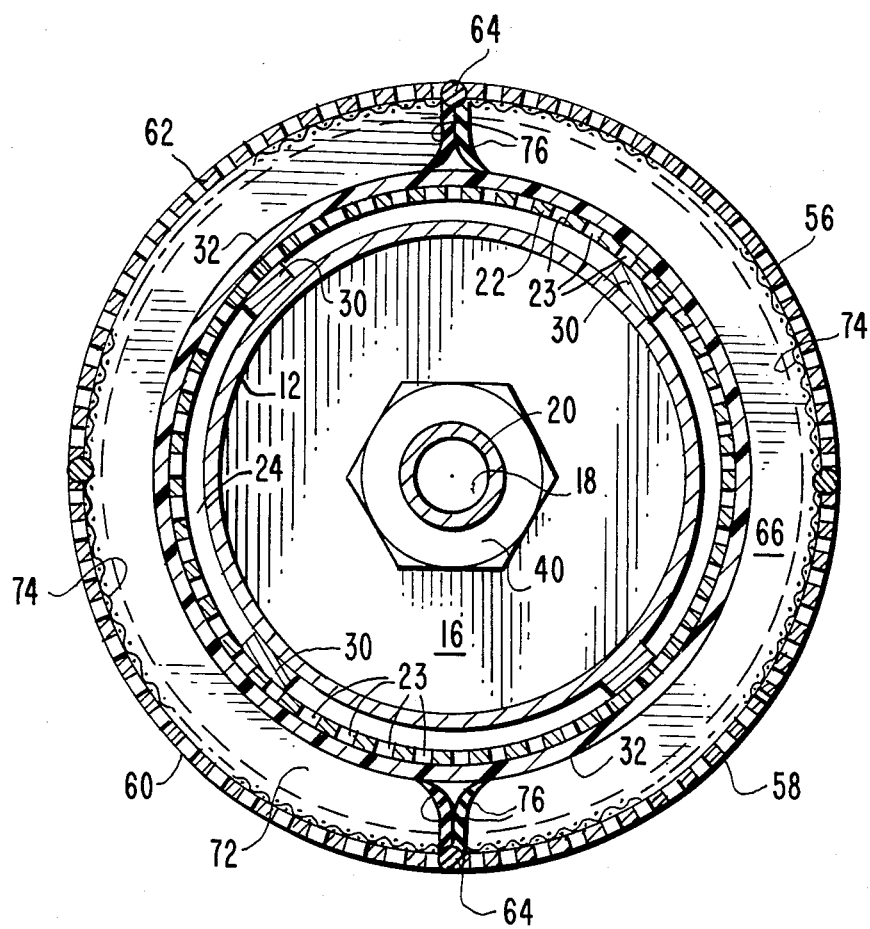
FIG. 2 is a cross-sectional top view of the filter illustrated in FIG. 1 in the closed position.
Figure 3:
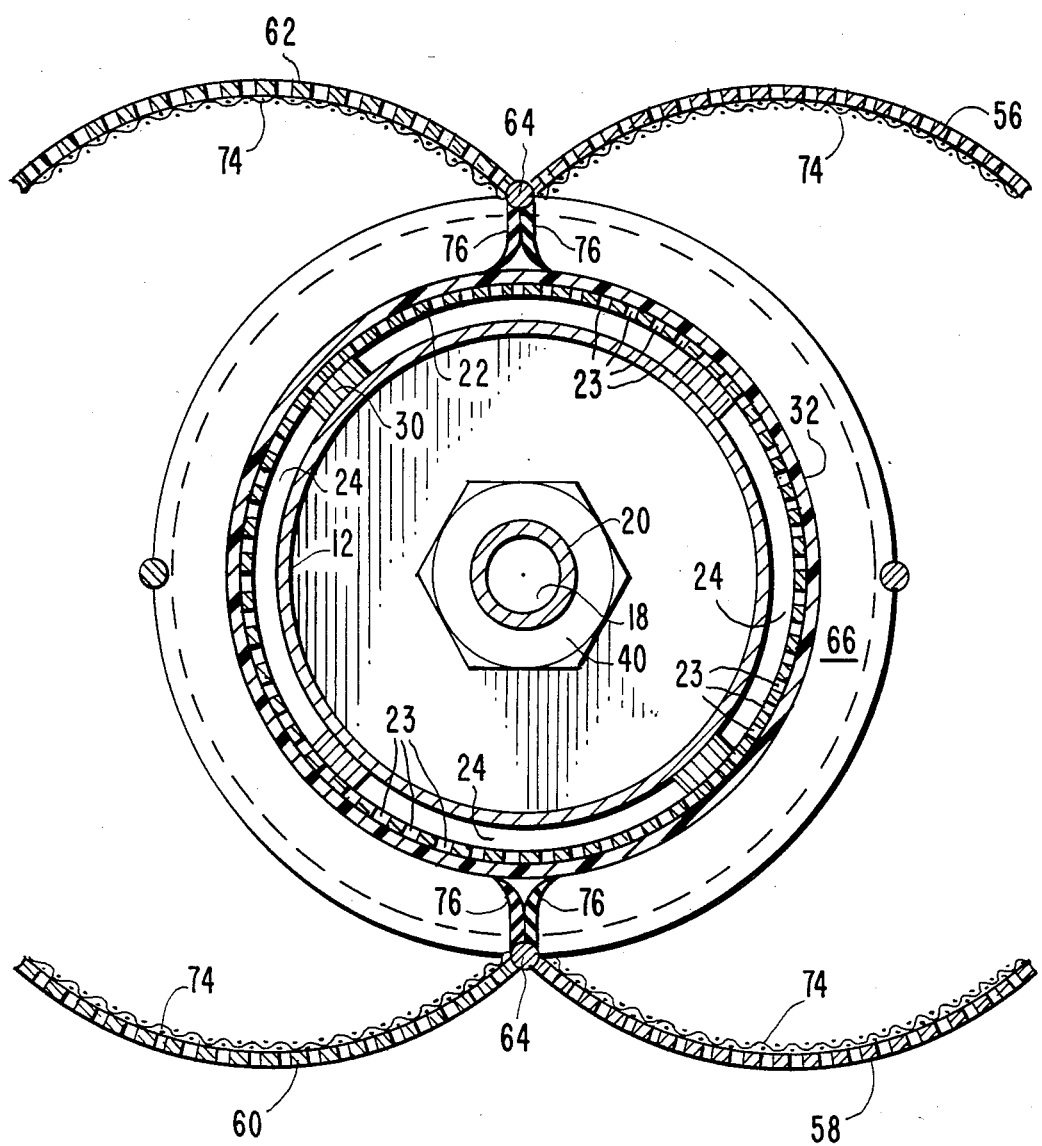
FIG. 3 is a cross-sectional top view of the filter illustrated in FIG. 1 in the open position for discharge of the filter cake.

The perforated filter support doors 56–62, when in the closed positinn depicted in FIG. 2, define a third annular space 72 surrounding the elastomeric bladder 32 and the filter support frame 22.

In accordance with the invention, there are provided filter means on the surface of the filter support doors facing the third annular space. As here embodied and most clearly depicted L in FIG. 3, the doors 56–62 have on their inner surface a filter member 74. The nature of the filter used with the present device depends on the liquid-solid mixture being treated. Particular success has been experienced using a filter of woven mesh material where the mesh is either comprised of plastic or metal fiber.

Preferably, the device includes a means for dividing the third annular space into a plurality of sections. As here embodied and most clearly depicted in FIG. 2, there are provided flexible dividers 76 extending across the third annular space 72 contacting the outer surface of the cylindrical bladder 32. In the embodiment depicted, the flexible dividers each comprise two strips of elastomeric material disposed longitudinally within the third annular space 72. The strips are parallel and in contact with each other along one edge of the strips where the strips contact the hinge 64, with the opposite edges of the strips being separated by the elastomeric bladder 32. Thus, there is provided a sealing relationship between the elastomeric bladder 32 and the flexible dividers 76. This sealing arrangement is facilitated by the strips having a tapered edge in contact with the bladder 32. It is the function of the flexible dividers to divide the third annular space 72 such that the filter cake formed on the interior surface of the filter member 74 can be readily removed when the hinged doors 56–62 are opened to discharge the filter cake. In applications where the solid forming the cake is strong and tenaciously bonded to the fileer, without the dividers it would be difficult to remove the filter cake from the surface of the filter.

In accordance with the invention, the device further includes means for introducing the liquid-solid mixture into the third annular space under pressure. As depicted in FIG. 1, the upper plate 46 includes openings 78 that are in flow communication with means (not shown) for supplying the liquid-solid mixture. In accordance with the invention, there is also provided means (not shown) for supplying gas pressure to the expandable annular space between the gas impervious chamber 12 and the bladder 32. As here embodied, the means for supplying gas pressure is in flow communication with the interior of the conduit 20.

Operation of the Device

With the device in a configuration depicted in FIGS. 1 and 2, the liquid-solid mixture is passed under pressure through opening 78 into the third annular space 72. Pressure on the liquid-solid mixture forces the liquid through the filter 74 and perforations in the doors 58 through 62. Continuous passage of additional liquid-solid mixture through the third annular space 72 results in a cake being built up on the inside surface of the filter member 74. When the characteristics of the cake, i.e., its density and permeability are such that it requires excessive pressure or time to pass additional liquid-solid mixture through the device then the flow of the liquid-solid mixture is stppped and compreseed gas is supplied through the conduit 20 into the first annular space 24. The gas passes through the perforations 23 in the cylindrical support frame 22 to distend the bladder 32 radially outward in a direction toward the doors 56–62. This forces additional liquid out of the filter cake such that, in the preferred mode of operation, the filter cake has a solid content of between 35 and 50 percent. The pressure necessary to force liquid from the cake to achieve such a solid content is in the range of from about 125 psi or below. Because the filter cake that is deposited on the doors of the device has structural integrity, the doors of the device 10 need not be of sufficient strength alone to withstand pressures exerted by the bladder during the final dewatering process because the cake provides additional strength.

Thus, the present invention provides a device and a method of operation that effectively dewaters liquid-solid mixtures in a manner that is both efficient and cost effective. Furthermore, the device for effecting the process is relatively simple to manufacture and maintain and can be readily automated to provide a batch-type process for liquid-solid separation.

The present invention has been disclosed in terms of a preferred embodiment but the invention is not limited thereto. The scope of the present invention is defined by the appended claims and their equivalents.

What is claimed:

1. A device for removing liquid from a liquid-solid mixture, said device comprising:
   a rigid gas impervious chamber;
   a perforated support frame disposed adjacent and outside said gas impervious chamber so as to define a first annular space therebetween;
   an elastomeric bladder overlaying the outer surface of said perforated support frame, said bladder and said chamber defining an expandable annular space in flow communication through perforations in said perforated support frame with said first annular space;
   perforated filter support doors hingedly affixed to said device, said filter support doors being capable of rotating on hinges to open and closed positions, said filter support doors in the closed position defining one wall of a third annular space surrounding said elastomeric bladder and said filter support members;
   filter means on the surface of said filter support doors facing said third annular space;
   means for introducing said liquid-solid mixture into said third annular space under pressure; and
   means for supplying gas pressure to said expandable annular space.

2. The device of claim 1, including means for dividing said third annular space into a plurality of sections.

3. The device of claim 2, wherein each of said means comprise flexible dividers extending across said third annular space contacting said elastomeric bladder.

4. The device of claim 3, wherein said flexible dividers each comprise two strips of elastomeric material in contact with each other along one edge of said strips where said strips contact the hinge with the opposite edges of said strips being separated by said elastomeric bladder.

5. The device of claim 1, wherein said filter means comprises a woven mesh material.

6. The device of claim 5, wherein said filter means material comprises plastic.

7. The device of claim 5, wherein said filter means material comprises metal fiber.

8. A device for removing liquid from a liquid from a liquid-solid mixture, said device comprising
   a rigid cylindrical gas impervious chamber, said chamber having one open end and one closed end;
   a perforated close-ended cylindrical support frame surrounding said chamber defining a first annular space between said chamber and said support frame, said closed end of said support frame being adjacent the closed end of said chamber;
   a close-ended cylindrical elastomeric bladder overlaying the outer surface of said perforated support frame, said bladder and said chamber defining an expandable annular space in flow communication through perforations in said perforated support frame with said first annular space;
   an upper plate cover adjacent the open ends of said chamber, said support frame and said bladder;
   means for sealing said open end of said bladder with respect to said upper plate cover;
   means for attaching said upper plate cover to said chamber;
   perforated close ended cylindrical filter support doors hingedly affixed to said device, said filter support doors being capable of rotating on hinges to open and closed positions, said filter support doors in the closed position defining one wall of a third annular space surrounding said elastomeric bladder and said filter support members;
   filter means on the surface of said filter support doors facing said third annular space;
   means for introducing said liquid-solid mixture into said third annular space under pressure; and
   means for supplying gas pressure to said expandable annular space.

9. The device of claim 8 wherein said gas pressure supply means includes a rigid gas conduit passing through said upper plate cover, one end of said conduit being affixed to the closed end of said chamber, the interior of said gas conduit being in flow communication with said first annular space and a source of gas pressure.

10. The device of claim 8 wherein said attaching means comprises at least one threaded member disposed to change the distance between said upper plate cover and the closed end of said chamber.

11. The device of claim 10 wherein said sealing means comprises means for confining the edge of said bladder between said open end of said chamber and said upper plate cover.

12. The device of claim 8 wherein said device includes a lower plate cover opposite said upper plate cover, said lower plate cover and said closed end of said bladder defining a space therebetween, said device including resilient seal means for preventing said liquid-solid mixture from entering said space.

13. The device of claim 12 wherein said seal means comprises an O-ring in said space, said O-ring being adjacent the outer radial surface of said cylindrical support frame.

14. The device of claim 8 including means for dividing said hhird annular space into at least two sections.

15. The device of claim 14 wherein each of said dividing means comprise a pair of elastomeric strips extending longitudinally within said third annular space, said strips having opposite pairs of edges, a first pair of edges being adjacent one another such that said strips are parallel to one another with their surfaces abutting, a second pair of edges being separated by said elastomeric bladder with the surfaces of said strips adjacent said second edge of said bladder abutting the surface of said bladder.

16. The device of claim 15 wherein the second edges of said strips are tapered.

17. A process for removing liquid from a liquid-solid mixture comprising:

introducing a liquid-solid feed mixture into an annular space under low pressure forcing said mixture through a filter means attached to perforated filter support doors which allows the liquid to penetrate but collects the solids, thereby forming a substantially solid filter cake;

introducing said mixture into said annular space until said filter cake obstructs the flow of said mixture through said filter means;

supplying compressed air into an expandable annular space to cause deformation of an elastomeric bladder which presses against said solid filter cake thereby forcing additional liquid out of said cake;

moving said perforated filter support doors, attached by hinges, to an open position discharging said filter cake from said filter means.

18. The process of claim 17, wherein said filter cake formed on said filter means provides structural support to said perforated filter support doors.

19. The process of claim 17, wherein said compressed air supplied to said annular space to deform said elastomeric bladder is at a pressure of 125 psi or below.

20. The process of claim 19, wherein said discharged filter cake has a solids content of between 35% and 50%.

* * * * *